Figure 9:
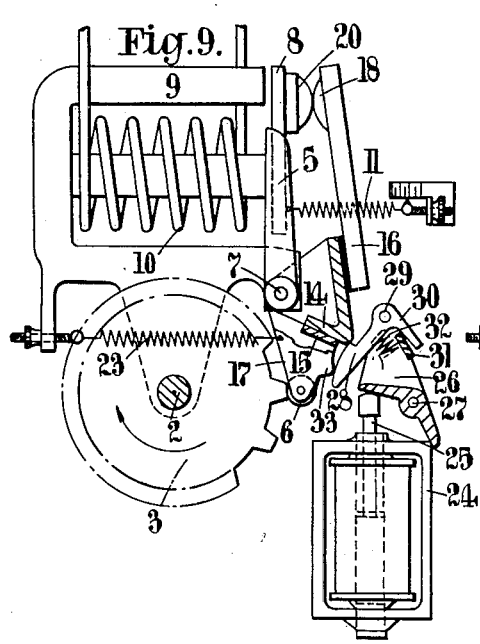
Figure 10:
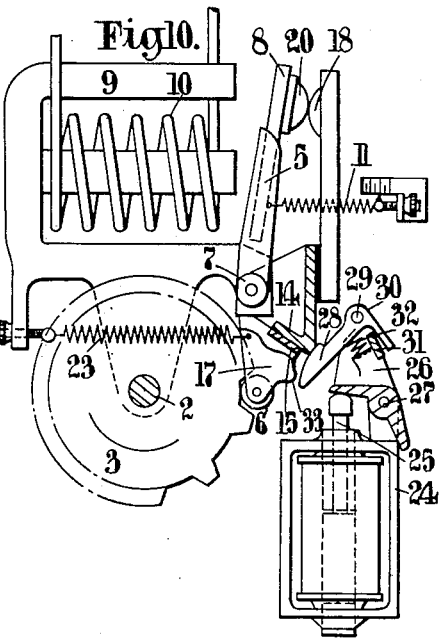

Mar. 3, 1925.  1,528,625
F. MORRIS
ELECTRICAL DEVICE FOR THE CONTROL OF MECHANICAL MOVEMENTS
Filed March 14, 1924     4 Sheets-Sheet 1
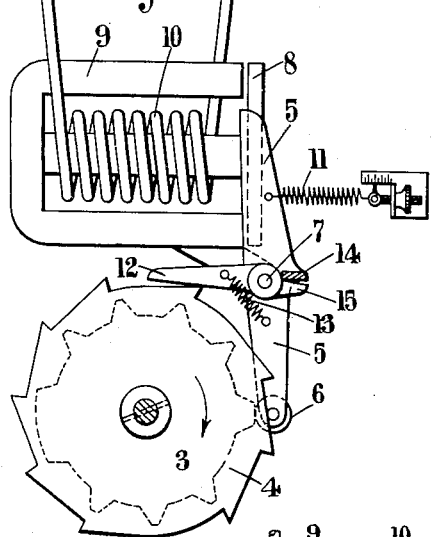
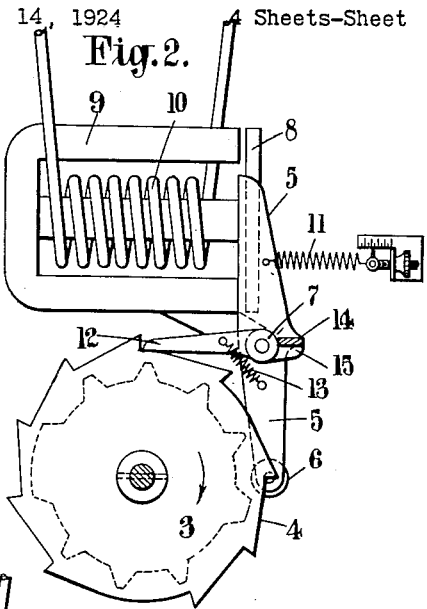
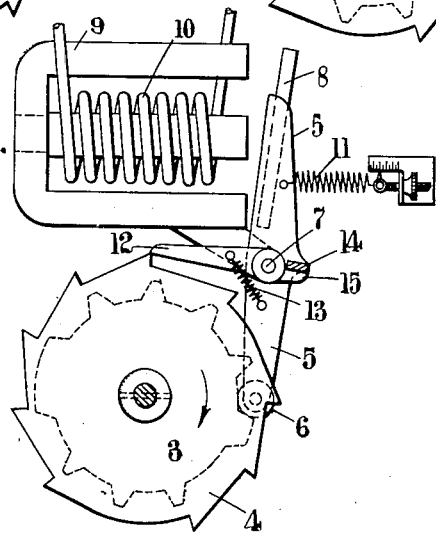
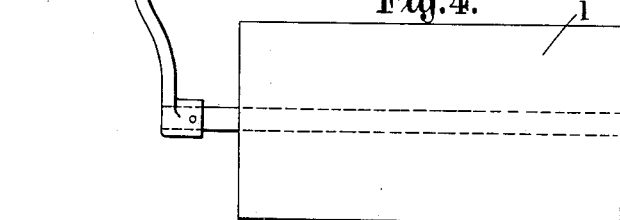
INVENTOR
Frederick Morris,
by Byrnes, Stebbins & Parmelee
his attys.

Mar. 3, 1925.           1,528,625
F. MORRIS
ELECTRICAL DEVICE FOR THE CONTROL OF MECHANICAL MOVEMENTS
Filed March 14, 1924     4 Sheets-Sheet 2
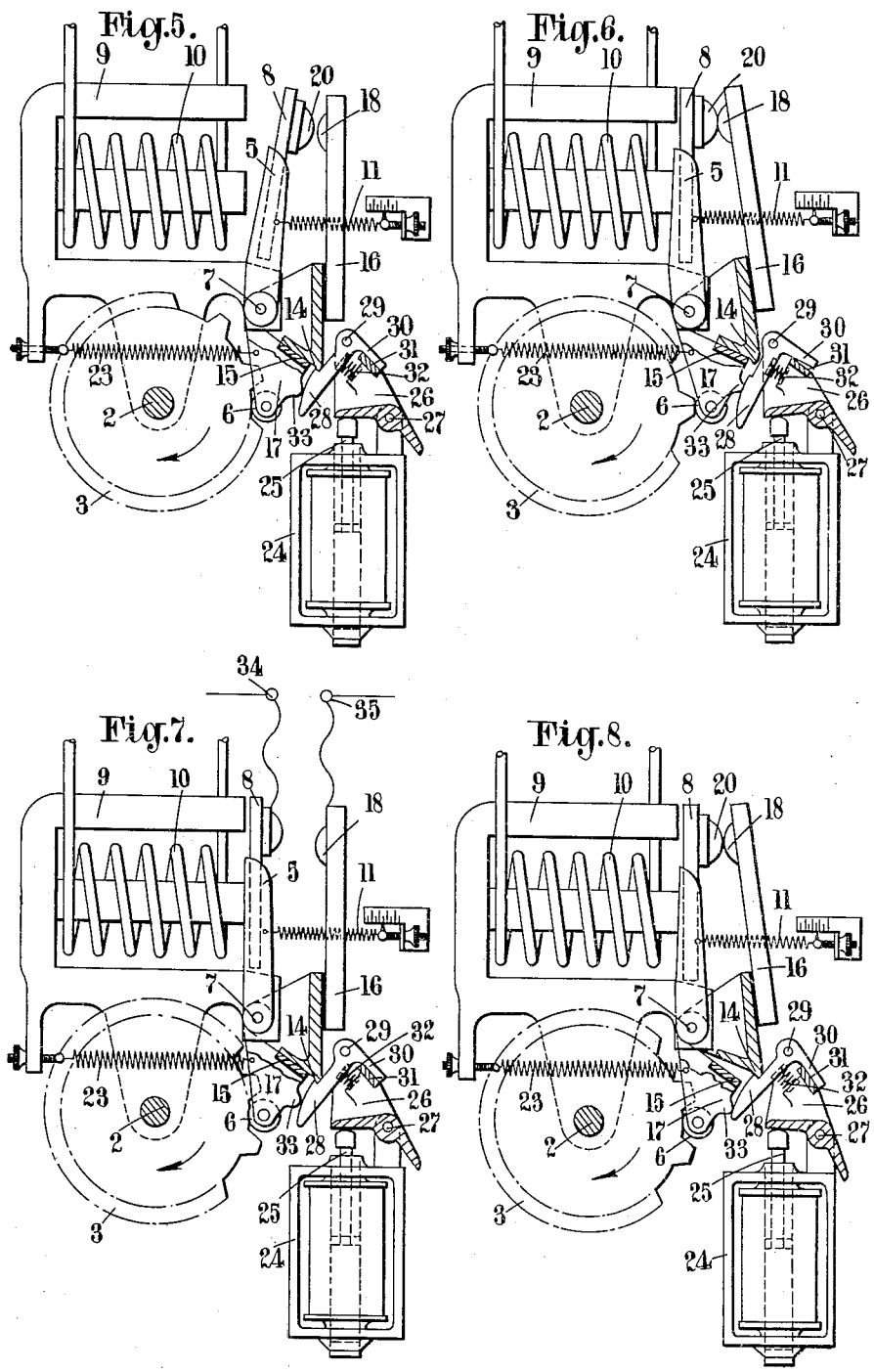

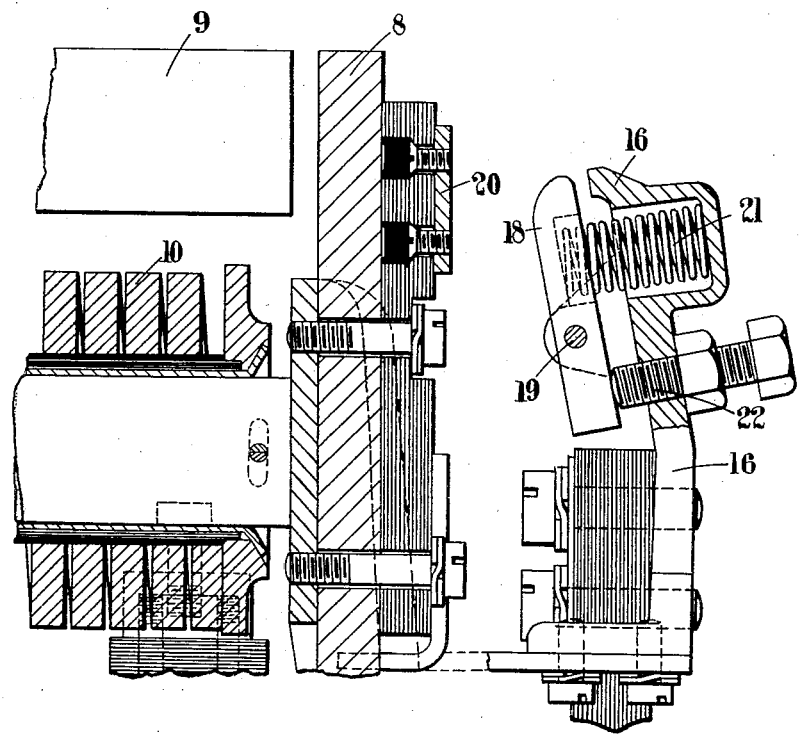

Patented Mar. 3, 1925.

1,528,625

UNITED STATES PATENT OFFICE.

FREDERICK MORRIS, OF BROXBOURNE, ENGLAND, ASSIGNOR TO THE ENGLISH ELECTRIC COMPANY LIMITED, OF LONDON, ENGLAND, A BRITISH COMPANY.

ELECTRICAL DEVICE FOR THE CONTROL OF MECHANICAL MOVEMENTS.

Application filed March 14, 1924. Serial No. 699,381.

*To all whom it may concern:*

Be it known that I, FREDERICK MORRIS, a British subject, residing at Broxbourne, Hertfordshire, England, have invented certain new and useful Improvements in Electrical Devices for the Control of Mechanical Movements, of which the following is a specification.

This invention deals with cases where movable members are under the control of the conditions in an electric circuit being, for instance, only permitted to move when the current in the circuit is above or below a determined limit. Examples of cases to which the invention applies are electric motor controllers or starters where it is desired that the contact arm or drum should not pass from one position to the next when the current through the motor exceeds the desired limit. In all such cases there is a mechanical movement or series of movements to be executed and there is a device associated with an electric circuit which has the capacity for preventing or permitting the movement according to the conditions in the circuit. The prevention of the movement may be effected in various ways, for instance, by the engagement of a mechanical lock or stop with a part to be moved or by a change of circuit of an electrical device, for instance, a motor by which the movement would be produced.

The present invention has for its object to provide arrangements of the kind above indicated which are simple in construction and provide security of operation. In accordance with the invention a control member is movable between a position in which it permits movement of the controlled part to take place and a position in which it prevents this movement and the member is under the influence of the part which moves and of an electrical device, and preferably also of a biassing device. The arrangement is such that the moving part which is to be controlled acts during its displacement on the control member so as to bring it into the preventing position so that on the completion of the displacement step of the moving part no further movement of it is possible if and as long as the electrical device holds the control member in the preventing position. It will be seen that the movement of the control member into the preventing position is positive and certain and that the electrical device has primarily the retaining function and hence is secure in its action and not liable to be influenced by accidental circumstances such as mechanical shocks which occur on vehicles or under other operating conditions.

The electrical device is preferably of the kind embodying an electro-magnet, the armature for which is carried by or operatively connected with the control member. This armature is then brought by the action of the part to be controlled into a position in which it can be strongly influenced by the electro-magnet. The movement of the control member by the part to be controlled may be conveniently effected by providing the said part with a cam or series of cams or their equivalent which bear upon the control member or some part operatively associated therewith during each displacement of the said part. Where the movement is rotary, and in accordance with one modification of this invention, a notched disc may be carried on the moving part and the control member may be provided with a roller or other projection adapted to line in any one of the notches when the member is in the permitting position so that on the subsequent displacement of the part the projection is forced out of the notch moving the member into the preventing position. The arrangements for making the prevention effective are such that they cannot come into action while the moving part is actually being displaced between the positions in which adjacent notches are in line with the projection on the control member. If the electrical conditions do not require the prevention of further displacement the projection on the control member enters the notch on the disc when it comes into the appropriate position and under these circumstances a further displacement can take place immediately. If, however, the electrical device is effective to prevent further displacement after a notch has come into the said position, the projection on the control member will not enter this notch until a change in the electrical conditions takes place. A biassing device such as a spring or weight is preferably arranged so as to move the projection into the notch as soon as the electrical conditions permit displacement of the control member to take place.

In the case where the shaft, instead of being hand-operated, is driven by power, the preventing action can be exerted on the driving device, for instance, by cutting off the supply of energy to that device or by rendering it ineffective in some other way. In the case of an electrical drive the movement of the control member to the preventing position may have the effect of opening a circuit by the movement of a contact carried by the control member away from another contact. In that case, it will generally be desirable to provide an auxiliary device to retain the circuit closed during the completion of the displacement step after the control member has been moved into the preventing position. This auxiliary device may consist of a bye-pass connection across the contacts opened by the control member which connection is broken at the completion of the displacement step.

The arrangement for electrical driving as above described can be modified by introducing an operative connection, which may take the form of an auxiliary control member, between the control member and the part to be controlled, in such a manner that a lost motion or its equivalent is introduced between the two control members. The arrangement is such that while the control member is moved positively by the auxiliary control member into the preventing position, the auxiliary control member can move back out of engagement with the control member leaving the latter in the preventing position until released when it is free to move back to the permitting position in which it can be re-engaged by the auxiliary control member when the next forward movement of the controlled part takes place. This arrangement has several advantages. It permits the engagement between the control member and the auxiliary control member to be made through the intermediary of a spring so that the control member is always made to complete its movement in the preventing position regardless of the actual extent of the movement of the auxiliary control member provided that this movement goes beyond a certain minimum position. It is also made possible for the auxiliary control member itself to have a certain controlling function, for instance it may form the auxiliary device (for example by closing a bye-pass connection) by which the preventing action of the control member is rendered inoperative until the completion of the displacement step of the controlled part.

With this arrangement also a single contact between the control member and the auxiliary control member may be made to perform the dual function of preventing further movement of the controlled part and of rendering this prevention inoperative until the completion of the displacement step of the controlled part.

In some cases it is desirable as an emergency measure to be able to cancel temporarily the preventive action of the control member. This can be done with an arrangement of the kind just described by providing an additional device for moving the auxiliary control member towards the electro-magnet after it has been allowed to move back from that position on the completion of the displacement step, this additional device being independent in its action of the movement of the controlled part. It will also usually be advantageous in these emergency arrangements to sub-divide the auxiliary control member into two separate pivoted parts with a lost motion between them. One of these parts acts upon the control member and is acted upon by the additional device and the other part is acted upon by the part to be controlled and also acts through the lost motion device upon the other part. An example of conditions where this requirement is found is the case where the controlled part is the drum of a controller for an electric motor and the controlling electro-magnet is a current limit device. Occasionally, in order to effect a start under difficult conditions, it is necessary to be able to move the controller forward a notch at a time in spite of the current exceeding the limiting value to which the electro-magnet is set.

Figure 11:
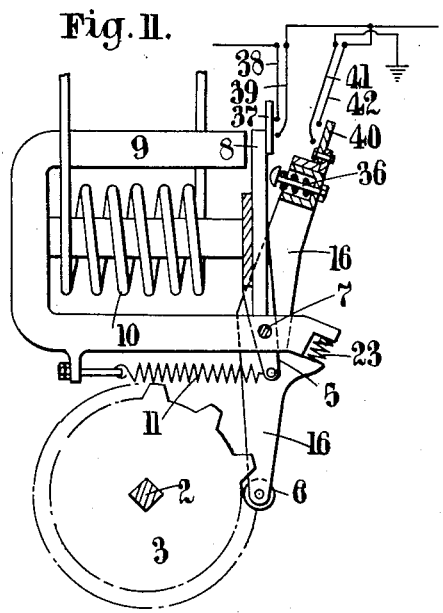
Figure 12:
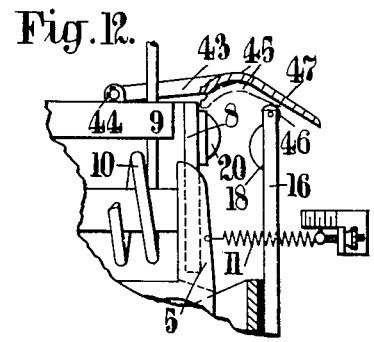

The invention will now be described by way of example with reference to the accompanying thirteen figures of drawings. In these drawings Figures 1, 2 and 3 show diagrammatically, in end elevation, three operating positions of a hand operated controlled member provided with a notched disc and with a ratchet wheel. The disc and wheel are operatively associated with a pivoted control member which in its turn is associated with an electrical device in the form of an electro-magnet. Figure 4 is a diagrammatic side elevation of the salient parts of the arrangement shown in Figures 1, 2 and 3 and it also shows a controller barrel switch and the operating handle therefor which are both parts of the controlled member. Figures 5 to 10 each show diagrammatically in end elevation an operating position of an electrically operated controlled member with its associated control member, sub-divided auxiliary control member, co-operating switch contacts on these members, electro-magnet, and a device for the temporary cancellation of the preventive action of the control member. Figure 11 shows diagrammatically, in end elevation, another arrangement of electrically operated controlled member with its associated control member, electro-magnet and system of switch contacts which include bye-pass contacts for the purpose previously referred to. Figure 12 is an end elevational view similar to Figures 5 to 10 of a part broken off from these figures showing also a delay action device and Figure 13 is a constructional detail view.

Referring to Figures 1 to 4 the controlled member denoted by 1 is the barrel of an electric controlling switch which is operated by the handle 2 and may for example control the series parallel connections of the driving motors on a tramcar. A notched disc 3 and a ratchet disc 4 are fixed to the shaft of the member 1. A control member 5, provided at its lower end with a roller 6, can oscillate around a fixed pivot 7. An armature 8 is fixed to the upper part of the member 5 and this armature co-operates with the electro-magnet 9 which can be energized by the winding 10. A spring 11 is arranged to pull the member 5 in a clockwise direction around its pivot and a separate pawl 12 is mounted upon the pivot 7 and is pulled by a spring 13 so that its free end engages with the teeth of the ratchet disc 4 unless this end is lifted against the force of the spring 13 due to the engagement of a projection 14 on the member 5 and a projection 15 on the pawl. This engagement takes place when the roller 6 is in one or other of the notches between the projections on the disc 3.

In the operating position shown in Figure 1 the roller 6 has been moved to an internotch position on top of one of the teeth of disc 3 due to the rotation of the handle 2 by the operator. If the operator now wishes to bring into operation the next controlling step on the member 1, he moves this member forward accordingly and with it the discs 3 and 4 until the position shown in Figure 2 is reached. It may be that for a short time after this position has been reached the driving motors of the tramcar, for example, take more than the permitted driving current and in that case the armature 8 will be held up to the electro-magnet 9 by the action of this motor current which flows in the winding 10. This condition of affairs is shown in Figure 2 and it is clear that the operator is prevented from advancing the member 1 to the next controlling step because the end of the pawl 12 is in engagement with one of the teeth on the ratchet disc 4. However as soon as the current drops below the permitted value the state of affairs shown in Figure 3 comes about in which the armature 8 has been released by the magnet 9 and has been moved back under the action of the spring 11 until the roller 6 has dropped into a notch between teeth in disc 3. In this position the end of the pawl 12 is lifted from engagement with a ratchet tooth and the operator is thus able to move forward the member 1 to another controlling position when a still further forward movement will be permitted or not in the same manner as has just been described.

Referring to Figures 5 to 10 the controlled member may as before be the barrel of an electric controlling switch which in this instance is moved to its several controlling positions, such as the series parallel control position for the main driving motors of a train, by an auxiliary electric motor. This controlled member is not shown as it is sufficient to show the notched disc 3 which is fixed to the shaft 2 of the controlled member. The control member is denoted by 5, the armature fixed thereto by 8, and an adjustable spring arranged to pull these members in a clockwise direction around a fixed pivot 7 by 11. An electro-magnet 9 energized by a winding 10 is arranged to co-operate with the armature 8. The two parts 16 and 17 of a sub-divided auxiliary control member, having co-operating flat projections 14 and 15, are each arranged so that they can oscillate independently around the pivot 7. The part 16 is provided on its upper end with an insulated spring controlled contact piece 18 (the spring is not shown), which co-operates with another insulated contact piece 20 fixed to the member 8. These contact pieces are joined by flexible connections to terminals 34 and 35 as shown in Figure 7 only. A constructional detail view of these contacts 18 and 20 is shown in Figure 13 and it will be observed that the contact 18 rotates upon a pivot 19 fixed to the member 16 and its movement is controlled on the one hand by the spiral spring 21 and on the other by the adjustable screw stop 22.

The part 17 is provided at its lower extremity with a pivoted roller 6 which rides upon the notched periphery of the disc 3 and oscillates the part 17 around the pivot 7 against the action of the spring 23.

The device for the temporary cancellation of the preventive action of the control member includes a solenoid magnet 24 having a vertically operating armature which when the magnet is energized lifts a rod 25 upwards and in so doing moves a lever bracket device 26 around its fixed pivot 27 in a clockwise direction. A latching member 28 is rotatably attached by a pivot 29 to the bracket 26 and a tail 30 on the latching member co-operates with a flat projection 31 on the bracket 26. A compression spring 32 acting between the members 26 and 28 tends to rotate the latter member in a clockwise direction around its pivot 29 and a projection 33 on the part 17 also tends under certain circumstances to rotate the member 28 in an anti-clockwise direction around its pivot.

The operation is as follows:—It may be supposed for example that an auxiliary electric motor has been caused under the action of the master controller of a train to move the controlled member, the shaft 2 and the disc 3 to an operating position such as shown in Figure 5 and that in this position the current taken by the driving motors of the train for example which flows in the winding 10 is not sufficient to hold up the control member 5 which consequently is pulled forward by the spring 11 so that the contacts 18 and 20 touch one another. A circuit is thus made by way of these contacts and the terminals 34 and 35 and the master controller of the train which enables the said controller to be effective to move the auxiliary motor the controlled member and the disc 3 towards the next operating position of the controlled member. In Figure 6 a condition of affairs is shown when the disc 3 has travelled half way towards the next position with the roller 6 on top of a tooth. It will be observed that the contacts 18 and 20 are still touching but that the part 16 has been rotated on its pivot 7 and has forced the armature 8 up against the magnet 9. In Figure 7 the disc 3 has travelled all the way to the next position but in this position the current for the time being in the winding 10 is sufficient to retain the armature 8 in the position shown whilst the roller 6 has moved into a recess between two teeth on disc 3 and in so doing has permitted the sub-divided auxiliary control members 16 and 17 to rotate around their pivots 7 and the contacts 18 and 20 to separate. The master controller cannot now operate the auxiliary motor again, unless the device for the temporary cancellation of the preventive action is operated, until the current in winding 10 has fallen to a value which permits the armature 8 and control member 5 to resume their positions shown in Figure 5 in which the contacts 18 and 20 again touch one another.

With the condition of affairs as in Figure 7 the temporary cancellation may be brought into operation by energizing the winding of solenoid magnet 24 the effect of which is to cause the rod 25 to move upwards and turn the bracket 26 around its pivot 27. This causes the latching member 28, which is in engagement with the projection 14, to move the member 16 into the position shown in Figure 8 when the auxiliary motor can again be moved forward by the master controller as the contacts 18 and 20 are again touching one another and notwithstanding the current in the winding 10 is above the normally permitted value. In Figure 9 the condition of affairs is shown in which a further step has been half completed under the action of the temporary cancellation device and it is to be observed just before this position is reached the projection 33 engages the latching member 28 and pushes it out of engagement with the projection 14. It is also to be observed that after this disengagement has taken place the latching member 28 cannot again engage the projection 14 until the magnet 24 has been de-energized. This will be evident from an examination of Figure 10 which shows the condition of affairs when the further step has been completed and when the current in the winding 10 has fallen below the normally permitted value.

In Figure 11 a device is shown which is to a large extent similar to the device shown in Figures 5 to 10. The parts denoted by the numerals 2, 3, 5, 6, 8, 9, 10 are similar in both devices but the auxiliary control member 16 in Figure 11 is not sub-divided and is provided with a spring controlled stop device 36 for engaging and pushing over the armature 8 which is fixed to the control member 5 and pulled by the action of spring 11 around the pivot 7. An insulated contact plate 37 is fixed to the armature 8 and connects two fixed spring contacts 38 and 39 when the armature 8 is in the permitting position but disconnects these contacts when the armature is held to the magnet 9. Another insulated contact plate 40 is fixed to the control member 16 and connects two fixed spring contacts 41 and 42 when the member 16 has been moved by the notched disc 3 into a position in which the roller 6 is between two operating positions namely when it is on top of one of the teeth of disc 3. When the roller is in a notch between teeth the contacts 41 and 42 are not connected by the plate 40. The contact 41 is for example connected to earth. The connection of the contacts 38 and 39 by the plate 37 may, for example, connect up a circuit to earth in such a manner that an auxiliary motor which drives the controlled member, the shaft 2 and the disc 3 may be operated by a master controller. When the armature 8 is held to the magnet 9 this circuit is interrupted but the auxiliary motor can still be operated by the master controller to complete the control step when the roller 6 is in a position between two control positions, namely on top of one of the teeth of disc 3, since the contacts 41 and 42 are connected by the plate 40 and thus a bye pass circuit is available through these contacts to earth. During the time that the armature 8 is held to the magnet 9 further movement of the auxiliary motor can not take place when the roller 6 is in a notch of the disc 3 as shown in Figure 11. The above system of contacts and contact plates could of course be employed in the case in which the breaking of a circuit at the contacts 38 and 39 (instead of the making of a circuit at these contacts) causes the preventing action. In this case the contacts 41 and 42 would be connected not in a bye-pass circuit but in series with the circuit containing the contacts 38 and 39.

Figure 12 shows the delay action device already referred to adapted to the arrangement shown in Figures 5 to 10. The device consists of an arm 43 pivoted at 44 to the electro-magnet 9. The arm contains a projection 45 which, when the arm is in its lowest position, comes in front of the armature 8, as shown by the dotted lines, and prevents the armature and its associated parts from moving to the right around the pivot 7 until a small roller 46 on the member 16 has by its engagement with the under side of a tail 47, which forms an extension of the arm 43, lifted the projection 45 upwards away from the armature 8 as shown in full lines. The configuration of the tail 47 is such that its engagement with the roller 46 cannot take place until the member 16 has nearly reached the position shown in the drawing and thus every time the armature 8 is pushed up against the magnet 9 by the member 16, it stays in this position for a moment, although the electro-magnet 9 may not be energized sufficiently to retain it there, and it is only when the roller 46 lifts the arm 43 that the contact 20 is moved by the spring 11 into connection with the contact 18. It will be apparent that if an auxiliary motor is used to drive the controlled member, the shaft 2 and the disc 3, that this device will cause it to pause as the roller 6 reaches each notch on the disc 3.

It is to be understood that while particular constructions have been described in some detail, they are only given as illustrations of the nature of the invention and not as an indication that the invention is limited to these details.

What I claim as my invention and desire to secure by Letters Patent is:—

1. Electric means for controlling mechanical movements comprising a controlled part, a control member, an electric device responsive to the conditions in an electric circuit and positive operative connecting means between said controlled part and said control member for moving the latter into a position in which it is influenced by the said electric device.

2. Electric means for controlling mechanical movements comprising an electric holding device responsive to the conditions in an electric circuit, a controlled part, a control member determining by its position the continuance of movement of the said part, and operative connecting means between said part and member, effective during the movement of the said part, for moving the said member into a position in which it may be retained by the said electric device.

3. Electric means for controlling mechanical movements comprising a rotary shaft, a control member adapted to influence the movement of said shaft, an electric device responsive to the conditions in an electric circuit, a cam on said shaft adapted to act upon said control member for moving the latter into the position in which it is influenced by the said electric device.

4. Electric means for controlling mechanical movements comprising a rotary shaft adapted to make a series of movements, a control member adapted to influence the movement of said shaft, an electric device responsive to the conditions in an electric circuit, a toothed wheel on said shaft having a tooth corresponding to each of the movements thereof each tooth being adapted to operate on the control member for moving the latter into a position in which it is influenced by the said electric device.

5. Electric means for controlling mechanical movements comprising a rotary shaft adapted to make a series of movements, a control member adapted to influence the movement of said shaft, an electric device responsive to the conditions in an electric circuit, a toothed wheel on said shaft having a tooth corresponding to each of the movements thereof each tooth being adapted to operate on the control member for moving the latter into a position in which it is influenced by the said electric device and in which it is adapted to limit the movement of the controlled part and means for preventing this limiting action from being effective so long as any one of the said teeth continues to act upon the control member.

6. Electric controlling means comprising an electric holding device responsive to the conditions in an electric circuit, a controlled part adapted to have a step by step movement, a control member determining by its position the continuance of the movement of the said part, operative connecting means between said part and member, effective during the movement of the said part, for moving the said member into a position in which it may be retained by the said electric device and means carried by the said part for preventing the movement of the controlled member beyond the limit of each step so long as the electric device holds the control member in the said position.

7. Electric controlling means comprising an electric holding device responsive to the conditions in an electric circuit, a controlled part, a control member, operative connecting means between said part and said member, effective during the movement of the said part, for moving the said member into a position in which it may be retained by the said electric device and an electric switch operated by the movement of the control member.

8. Electric controlling means comprising an electric holding device responsive to the conditions in an electric circuit, a controlled part, a control member, operative connecting means between said part and said member, effective during the movement of the said part, for moving the said member into a position in which it may be retained by the said electric device, an electric switch operated by the movement of the control member, and means for cancelling the action of the said switch during a stage of the movement of the controlled part.

9. Electric means for controlling mechanical movements comprising a controlled part, a control member, an electric device responsive to the conditions in an electric circuit and positive operative connecting means between said controlled part and said control member for moving the latter into a position in which it is influenced by the said electric device, said means including an auxiliary control member having driving connection with the main control member during the movement into the said position but being free to move away from that position when the main member is retained therein by the influence of the said electric device.

10. Electric controlling means comprising a controlled part, a main control member and an auxiliary control member, an electric device responsive to the conditions in an electric circuit, co-operating electric contacts on said main and auxiliary control members and operative connecting means between said controlled part and said control members, said means being effective during the movement of the controlled part and providing for the moving of the said members together into a position in which the main member is influenced by the said electric device and for the movement of the auxiliary member away from that position while the main member is retained therein by the said device.

11. Electric means for controlling mechanical movements comprising a controlled part, a control member, an electric device responsive to the conditions in an electric circuit and positive operative connecting means between said controlled part and said control member for moving the latter into a position in which it is influenced by the said electric device, said means including an auxiliary control member having driving connection with the main control member during the movement into the said position but being free to move away from that position when the main member is retained therein by the influence of the said electric device, the driving connection between the main and auxiliary members being made by way of an extensible elastic part whereby engagement is secured during an appreciable relative displacement of the members.

12. Electric controlling means comprising a controlled part, an electric holding device responsive to the conditions in an electric circuit, main and auxiliary control members determining by their positions relative to each other the continuance of the movement of the said part, operative connecting means between said part and said control members for moving the members together into a position in which the main member may be retained by the said electric device and permitting the auxiliary member to return separately from said position and means for cancelling temporarily the possibility of this separate movement.

13. Electric controlling means comprising an electric holding device responsive to the conditions in an electric circuit, a pair of control members carrying co-operating electric contacts, means for moving the said members together to a position in which one of them may be retained by the said electric device, said means comprising a lost motion connection such that the other member may return from the said position while the first member is retained therein, and means for providing temporarily a rigid connection between the said members maintaining them in the position in which they engage each other.

14. Electric controlling means comprising an electromagnet, a controlled part, two control members forming jointly an electric switch controlling the operating circuit of the said part and one of them forming the movable armature of said electromagnet, operative connecting means between the controlled part and the said armature for moving the latter towards the electromagnet, means for maintaining the switch formed by two control members in one operative condition during substantially the whole of the operating time when the armature is not held by the electromagnet and for bringing it to the other operative condition when the armature is so held and means for restoring the first condition while the armature is held by the electromagnet.

15. Electric controlling means comprising an electromagnet, a controlled part, two control members forming jointly an electric switch controlling the operating circuit of the said part and one of them forming the movable armature of said electromagnet, operative connecting means between the controlled part and the said armature for moving the latter towards the electromagnet, means for maintaining the switch formed by two control members in one operative condition during substantially the whole of the operating time when the armature is not held by the electromagnet and for bringing it to the other operative condition when the armature is so held, means for restoring the first condition while the armature is held by the electromagnet and means actuated by the controlled part for putting the said restoring means out of action temporarily.

In testimony whereof I affix my signature.

FREDERICK MORRIS.